United States Patent [19]

Harry

[11] Patent Number: 5,697,727

[45] Date of Patent: Dec. 16, 1997

[54] LOCK FOR FIXING A SEAT OF A MOTOR VEHICLE TO A FLOORPAN OF THE VEHICLE

[75] Inventor: Sylvain Harry, Nogent-sur-Vernisson, France

[73] Assignee: Cesa-Compagnie Europeenne de Sieges pour Automobiles, Levallois Perret Cedex, France

[21] Appl. No.: 655,023

[22] Filed: May 29, 1996

[30] Foreign Application Priority Data

Jun. 9, 1995 [FR] France ............... 95 06868

[51] Int. Cl.$^6$ ............... F16B 21/06; B60N 2/00
[52] U.S. Cl. ............... 403/325; 403/328; 403/DIG. 6; 403/321; 296/63
[58] Field of Search ............... 403/321, 322, 403/325, 326, 327, 328, DIG. 4, DIG. 6, 240, 256; 296/63; 411/348

[56] References Cited

U.S. PATENT DOCUMENTS

| | | |
|---|---|---|
| 1,510,445 | 9/1924 | Henry . |
| 2,729,495 | 1/1956 | Dejean ............... 403/321 X |
| 2,898,797 | 8/1959 | Bronstein . |
| 3,065,011 | 11/1962 | De Pew ............... 403/328 |
| 4,671,718 | 6/1987 | Eakin ............... 403/408.1 X |
| 4,850,774 | 7/1989 | Weaver et al. ............... 411/348 X |
| 5,620,225 | 4/1997 | Harry ............... 411/348 X |

FOREIGN PATENT DOCUMENTS

| | | |
|---|---|---|
| 2105523 | 4/1972 | France . |
| 2699973 | 7/1994 | France . |
| 2343071 | 2/1975 | Germany . |
| 4124868 | 1/1993 | Germany . |

*Primary Examiner*—Anthony Knight
*Assistant Examiner*—William L. Miller
*Attorney, Agent, or Firm*—Sughrue, Mion, Zinn, Macpeak & Sons, PLLC

[57] ABSTRACT

A lock including a lock bolt (12) equipped with a locking body (14) of cylindrical overall shape intended to be locked by snap-fitting into a locking orifice (16) of complementary shape made in a striker plate (18). The lock bolt (12) additionally includes an anti-hammer ring (76) surrounding a region of the locking body (14) which, when the lock bolt (12) is locked, is in contact with the periphery of the locking orifice (16). As a preference, the body (14) is equipped with a releasable snap-fitting mechanism including bearing limits (40) for axial bearing which are intended to interact with a first face (36) of the striker plate, and at least one retractable locking ball (42) intended to interact with a second face (38) of the striker plate. When the lock bolt (12) is locked, the anti-hammer ring (76) extends axially between the bearing elements (40) and the ball (42), lying adjacent to the first face (36) of the striker plate.

10 Claims, 2 Drawing Sheets

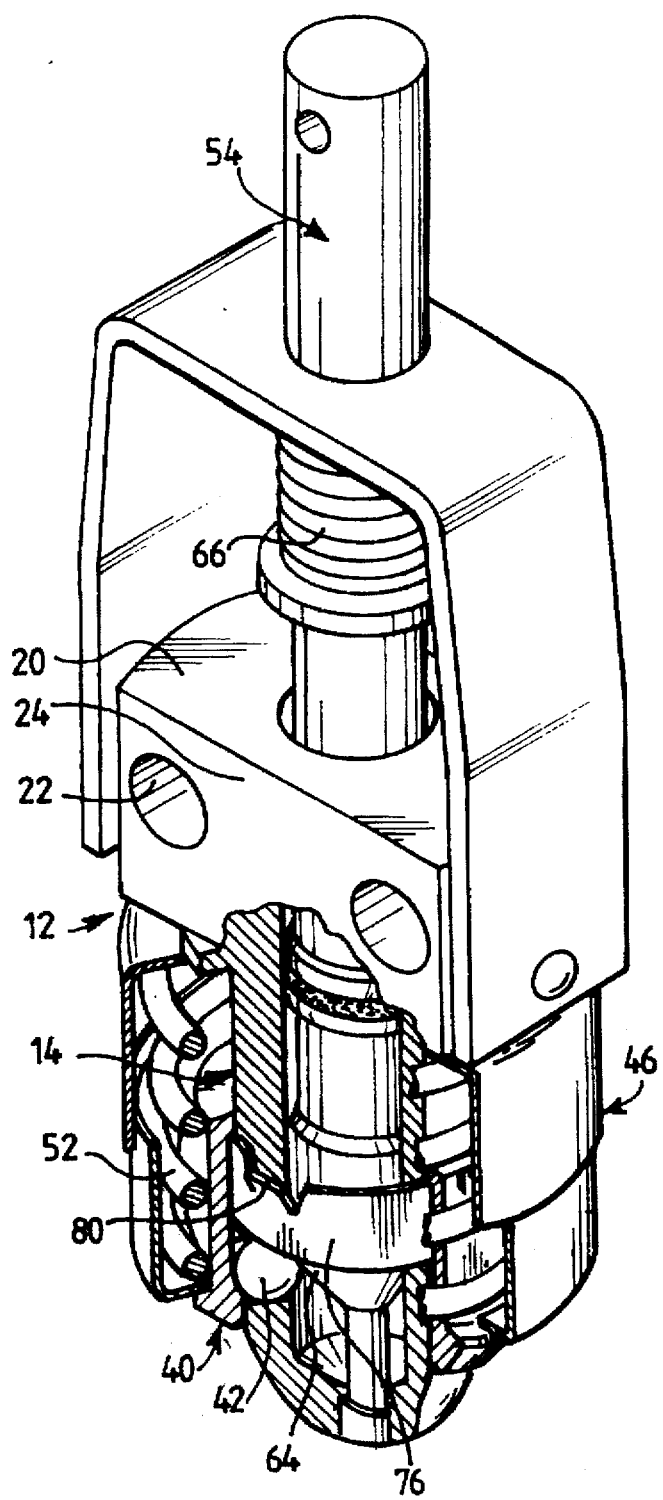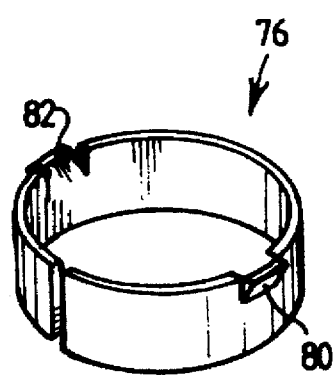
FIG. 1
FIG. 4

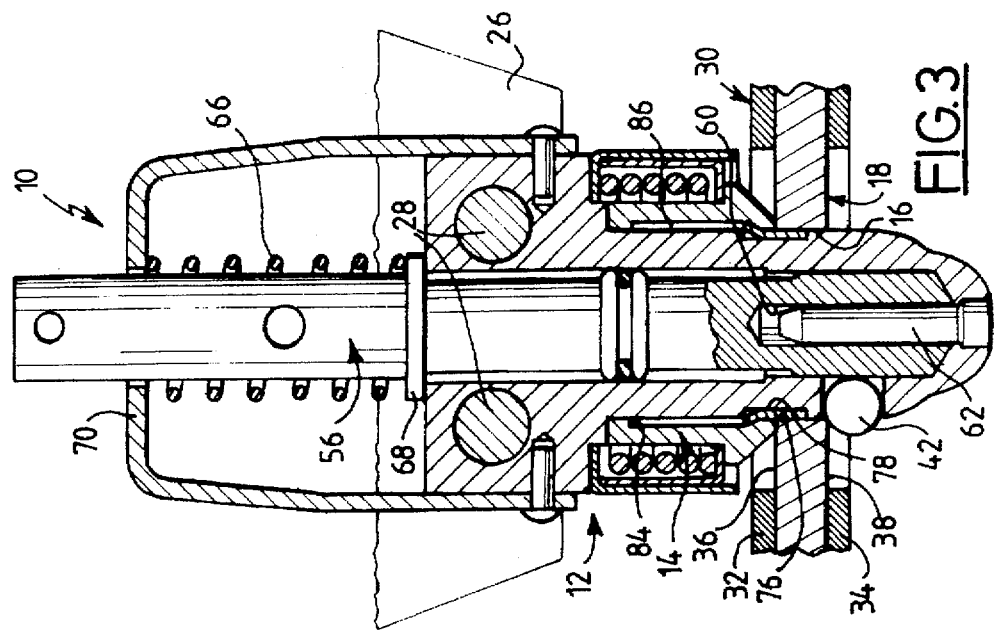

LOCK FOR FIXING A SEAT OF A MOTOR VEHICLE TO A FLOORPAN OF THE VEHICLE

BACKGROUND OF THE INVENTION

The present invention relates to a lock intended in particular for fastening a seat for a motor vehicle to a floorpan of this vehicle.

Already known in the state of the art, in particular from FR-A-2,699,973 is a lock of the type comprising a lock bolt equipped with a locking body of cylindrical overall shape intended to be locked by snap-fitting into a locking orifice of complementary shape formed in a striker plate.

A lock of this type makes it possible, for example, removably to attach a seat to the floorpan of the passenger compartment of a motor vehicle of the single-volume type. In this case, the lock is arranged so that the lock bolt is secured to a leg of the seat and the striker plate is secured to the floorpan.

Some removable seats, which have four attachment legs, can be folded up into a configuration in which they take up a reduced amount of floor space and in which just two legs are attached to the floorpan by means of locks of the aforementioned type. In this case, as the vehicle moves along, the locks are subject to significant mechanical stresses owing in particular to the fact that the seats, which are relatively heavy, are in unstable equilibrium in their configuration which takes up less floor space. These stresses may eventually cause wearing of the locks, especially by hammering of the lock bolt and of the striker plate at their contacting regions, the risk being that this wearing will impede the correct operation of the locks.

DE-A-23 43 071 describes a lock of the same type as the one in FR-A-2,699,973, comprising locking balls housed in the locking body. The balls are kept in their housing by at least one ring surrounding the locking body. This ring is set back relative to the external surface of the body so that it cannot be in contact with the periphery (i.e., the inner peripheral wall) of the locking orifice.

SUMMARY OF THE INVENTION

The object of the invention is to propose a lock which is very wear-resistant, simple to manufacture and economical.

To this end, the subject of the invention is a lock of the aforementioned type, characterized in that the lock bolt additionally includes an anti-hammer ring surrounding a region of the locking body which, when the lock bolt is locked, is in contact with the periphery (i.e., the inner peripheral wall) of the locking orifice.

According to other features of the invention:

- the locking orifice extends between two opposite faces of the striker plate, the locking body is equipped with releasable snap-fitting means comprising means for axial bearing which are intended to interact with a first face of the striker plate, and at least one retractable locking ball intended to interact with the second face of the striker plate, and when the lock bolt is locked, the anti-hammer ring extends axially between the bearing means and the ball, lying adjacent to the first face of the striker plate;
- the lock bolt further includes means for moving the ball radially between a retracted position for releasing the lock bolt and a projecting position for locking this lock bolt, towards which position the ball is urged elastically and in which the ball interacts with the second face of the striker plate, the means for axial bearing comprise a bearing bush mounted so that it can slide axially around the locking body and the anti-hammer ring, while being able to move against an elastic force returning this bush from a position for releasing the lock bolt in which the bush covers the ball, holding it in the retracted position, into a position for locking the lock bolt, in which position the bush is distanced axially from the ball, the latter being in a projecting position, and the anti-hammer ring includes means for holding the bearing bush in its position for releasing the lock bolt;
- the holding means comprise complementary axial stops formed on surfaces which face each other belonging to the anti-hammer ring and to the bush;
- the complementary stops comprise at least one radial projection which is formed in the external surface of the ring and a shoulder which is formed in the internal surface of the bearing bush and which delimits one end of a clearance counterbore for the radial projection;
- the radial projection is delimited by a tab cut in the anti-hammer ring and bent towards the outside thereof;
- the anti-hammer ring includes two diametrically opposite tabs;
- the snap-fitting means comprise five balls spaced apart angularly;
- the anti-hammer ring is made of spring steel;

Another subject of the invention is an arrangement of a lock as defined hereinabove, characterized in that the lock bolt is secured to a leg of a seat for a motor vehicle and the striker plate is secured to a floorpan of the vehicle.

The invention will be better understood from reading the description which will follow, given merely by way of example and made with reference to the attached drawings in which:

BRIEF DESCRIPTION OF THE DRAWINGS

FIG. 1 is a perspective view, with cutaway, of a lock according to the invention;

FIG. 2 is a view in axial section of the lock of FIG. 1, in which the lock bolt is released;

FIG. 3 is view similar to FIG. 2 in which the lock bolt is locked;

FIG. 4 is a perspective view of the anti-hammer ring.

DESCRIPTION OF PREFERRED EMBODIMENTS

FIGS. 1 to 3 represent a lock according to the invention, denoted by the overall reference 10 and intended to fasten a removable feet for a motor vehicle to the floorpan of the passenger compartment of the vehicle.

The lock 10 comprises a lock bolt 12 equipped with a locking body 14 in the overall shape of a cylindrical pin intended to be locked by snap-fitting into a locking orifice 16 of complementary shape formed in a striker plate 18 illustrated in FIG. 3.

The locking body 14 includes a fastening head 20 equipped with two transverse drillings 22 emerging in two opposed flats 24, just one of these flats being visible in FIG. 1. The head 20 is attached to one end 26 of a leg of the seat, this end being represented in FIGS. 2 and 3, by means known per se, for example rivets 28 housed in the drillings 22.

The striker plate 18 has the overall shape of a plate. It is fastened to the floorpan 30 of the vehicle, for example between two walls 32, 34 delimiting the latter, in a way known per se.

The locking orifice 16 extends between two opposite faces 36, 38 of the striker plate.

The locking body 14 is equipped with releasable snap-fitting means comprising means 40 for axial bearing which are intended to interact with a first face 36 of the striker plate, known as the bearing face, and retractable locking balls 42, just one of which is represented in the figures, which are intended to interact with the second face 38 of the striker plate, known as the locking face.

In the example described, the lock bolt 12 includes five balls 42 housed in radial passages 42A spaced apart angularly and formed in the locking body 14. As an alternative, the lock bolt 12 may have a smaller or larger number of balls.

The means for axial bearing 40 comprise a bearing bush 44 mounted so that it can slide axially about the locking body 14, and connected to a telescopic annular casing 46 surrounding the body 14.

The bush 44 has a first bearing end 44A intended to interact with the bearing face 36 of the striker plate, and a second blocking end 44B intended to interact with a blocking shoulder 47 formed in the locking body 14.

The casing 46 includes two half-casings 48, 50 nested one inside the other, one of which, which is stationary, is secured to the locking body 14 and the other of which, which is mobile, is secured to the bush 44.

The half-casings 48, 50 form bearing seats for a return spring 52 housed in the casing and urging the bush 44 into a position for releasing the lock bolt 12, which position will be described later as will the means for holding the bush 44 in this position.

The lock bolt 12 further comprises means 54 for moving the balls 42 radially between a retracted position for releasing the lock bolt 12 and a projecting position for locking this lock bolt, in which position the balls interact with the locking face 38 of the striker plate.

These movement means 54 include a needle 56 mounted so that it can slide in a blind axial bore 58 formed in the locking body 14 so that it communicates with the passages 42A. The needle 56 extends partially outside the bore 58.

The internal end 56I of the needle is equipped with a blind axial hole 60 in which an axial finger 62 fastened in the closed end of the bore 58 is received. The finger 62 both axially guides the needle 56 and keeps the balls 42 in their passages when the balls are in the retracted position.

The internal end 56I is delimited by a frustoconical surface 64 converging towards the closed end of the bore 58 so as to form a slope intended to interact with the balls 42 in order to urge them radially into their projecting position.

The needle 56 is urged elastically towards the closed end of the bore 58 so as to move the balls 42 into their projecting position, by a return spring 66 surrounding the external end 56E of the needle. This spring 66 bears, on the one hand, on a collar 68 for limiting the depth of penetration of the needle 56 into the bore 58, which is formed integrally with the external end 56E and, on the other hand, on a through-seat 70 through which the needle 56 passes, and which is delimited by a stirrup piece riveted to the head 20.

Also represented in the figures is an O-ring seal 72 arranged around the internal end 56I of the needle in a groove delimited by two annular projections 74 of this needle.

An anti-hammer ring 76 represented in detail in FIG. 4 is housed in an annular groove 78 formed in the external surface of the locking body 14 so that the external surface of the ring 76 lies flush with the external surface of the body 14 and is surrounded by the bush 44.

The ring 76 is preferably slit so as to allow it to be fitted by pushing and elastic expansion around the locking body 14, then by snap-fitting into the groove 78.

The ring 76 is manufactured in a material with a hardness substantially mid-way between that of the locking body 14 and that of the striker plate 18, preferably of spring steel.

The ring 76 includes two diametrically opposite tabs 80, 82 cut from the ring and bent towards the outside thereof so as to form radial projections for holding the bush 44 in the position for releasing the lock bolt 12.

The tabs 80, 82 are intended to interact with a shoulder 84 which is formed in the internal surface of the bush 44 and which delimits one end of a clearance counterbore 86 for the tabs.

As an alternative, the ring 76 may have a single tab or more than two tabs. Moreover, the tabs 80, 82 can be replaced by any other radial projection formed on the external surface of the ring 76.

The operation of the lock 10 is very simple and allows the lock bolt 12 to snap-fit automatically into the striker plate 18, as will be specified hereinbelow.

Let us first of all consider the lock 10 in the initial configuration represented in FIGS. 1 and 2, in which it is unlocked.

In this configuration, the bush 44 is in a position of releasing the lock bolt 12 in which position it covers and protects the balls 42, holding them in the retracted position. The tabs 80, 82 butt against the shoulder 84 so as to hold the bush 44 in this position, opposing the elastic return force of the spring 52. The balls 42 interact with the slope 64 so as to keep the needle 56 in a standby position.

In order to lock the lock bolt 12, the locking body 14 is pushed into the locking orifice 16, pushing the lock bolt 12 towards the striker plate 18. The bearing face 36 of the striker plate then interacts with the bearing end 44A of the bush, urging this bush against the elastic force of the spring 52.

The bush 44 is thus moved into a position of locking the lock bolt 12 represented in FIG. 3, in which position the blocking end 44B of the bush butts against the blocking shoulder 47 of the body 14.

As the bush 44 is axially distanced from the balls 42, the latter are released. Under the effect of the elastic return force of the spring 66, the needle 56 penetrates the bore 58 and the slope 64 moves the balls 42 towards their projecting position for locking the lock bolt. The needle 56 is immobilized, through interaction of the collar 68 with the head 20, in an active position in which the balls 42 interact with the periphery of the needle 56 axially extending the large-diameter end of the slope 64. The locking of the lock bolt is irreversible unless the needle 56 is deliberately moved as will be specified later.

The penetration and locking of the lock bolt 12 into the striker plate 18 take place against the elastic return force of the spring 52 of the bush. However, the weight of the seat carrying the lock bolt allows this elastic force to be compensated for, at least in part.

Referring to FIG. 3 it will be noted that when the lock bolt 12 is locked, the anti-hammer ring 76 surrounds a region of the locking body which, if the ring were not present, would be in contact with the periphery (i.e., the inner peripheral wall) of the locking orifice. More specifically, the ring 76 extends axially between the bearing end 44A of the bush and the balls 42, lying adjacent to the bearing face 36 of the striker plate.

In order to unlock the lock bolt 12, all that is required is for the external end 56E of the needle to be pulled against the elastic return force of the spring 66, using a conventional control member (not represented in the figures) connected to the needle 56 in a way known per se.

The slope 64 is thus brought in line with the balls 42 which can then retract. The spring 52 urges the lock bolt 12 away from the striker plate 18, pushing the bush 44 back into its position for releasing the lock bolt which is represented in FIGS. 1 and 2. In this case, the bush 44 acts like an ejector.

The invention is not limited to the embodiment illustrated in the figures.

In particular, the tabs 80, 82 and the shoulder 84 for holding the bush 44 may be replaced by any other complementary axial stops formed on surfaces opposite each other belonging to the ring 76 and to the bush 44.

The invention has many advantages.

In particular, the anti-hammer ring is simple to manufacture and of low cost. It is arranged in the wear-sensitive part of the locking body.

In this way, the anti-hammer ring manufactured in a very strong steel makes it possible to protect the locking body in its region of contact with the striker plate and to distribute the mechanical stresses exerted by the striker plate on the locking body.

Moreover, the anti-hammer ring makes it possible to hold the bearing bush in its position for releasing the lock bolt.

What is claimed is:

1. A lock comprising a striker plate and a lock bolt including a locking body (14) of cylindrical overall shape intended to be locked by snap-fitting into a locking orifice of complementary shape made in the striker plate (18), wherein the lock bolt (12) additionally includes an anti-hammer ring (76) which surrounds a region of the locking body (14), and which when the lock bolt (12) is locked, is in contact with an inner peripheral wall of the locking orifice (16) and prevents contact between said region of the locking body and the inner peripheral wall.

2. The lock according to claim 1, wherein the locking orifice (16) extends between two opposite faces (36, 38) of the striker plate, wherein the locking body (14) is equipped with releasable snap-fitting means comprising means (40) for axial bearing which is intended to interact with a first face (36) of the striker plate, and at least one retractable locking ball (42) intended to interact with a second face (38) of the striker plate, and wherein when the lock bolt (12) is locked, the anti-hammer ring (76) extends axially between the bearing means (40) and the ball (42), and adjoins the first face (36) of the striker plate.

3. The lock according to claim 2, wherein the lock bolt (12) further includes means (54) for moving the ball (42) radially between a retracted position for releasing the lock bolt (12) and a projecting position for locking said lock bolt, towards which projection position the ball is urged elastically and in which the ball interacts with the second face (38) of the striker plate, wherein the means for axial bearing comprises a bearing bush (44) mounted so that it can slide axially around the locking body (14) and the anti-hammer ring (76), while being able to move against an elastic force returning said bush from a position for releasing the lock bolt in which the bush (44) covers the ball (42), and holds the ball in the retracted position, into a position for locking the lock bolt (12) in which the bush (44) is distanced axially from the ball (42) which is in said projecting position, and wherein the anti-hammer ring (76) includes means (80 to 84) for holding the bearing bush (44) in its position for releasing the lock bolt (12).

4. The lock according to claim 3, wherein the holding means comprises complementary axial stops (80 to 84) formed on mutually facing surfaces of the anti-hammer ring (76) and the bush (44) respectively.

5. The lock according to claim 4, wherein the complementary stops comprise at least one radial projection (80, 82) which is formed in an external surface of the ring (76) and a shoulder (84) which is formed in an internal surface of the bearing bush (44) and which delimits one end of a clearance counterbore (86) for the radial projection (80, 82).

6. The lock according to claim 5, wherein the radial projection (80, 82) is delimited by a tab cut in the anti-hammer ring (76) and bent towards the outside thereof.

7. The lock according to claim 6, wherein the anti-hammer ring (76) includes two diametrically opposite tabs (80, 82).

8. The lock according to claim 2, wherein the snap-fitting means comprises five balls (42) spaced apart angularly.

9. The lock according to claim 1, wherein the anti-hammer ring (76) is made of spring steel.

10. The lock according to claim 1 wherein the lock bolt (12) is adapted to be secured to a leg (26) of a seat for a motor vehicle and the striker plate is adapted to be secured to a floorpan (30) of the vehicle.

* * * * *